(12) United States Patent
Shachnai et al.

(10) Patent No.: US 7,349,351 B2
(45) Date of Patent: Mar. 25, 2008

(54) METHOD FOR DETERMINING A MASTER RING FOR AN OPTICAL COMMUNICATIONS NETWORK

(75) Inventors: Hadas Shachnai, Haifa (IL); Yihao Lisa Zhang, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 660 days.

(21) Appl. No.: 10/985,495

(22) Filed: Nov. 10, 2004

(65) Prior Publication Data

US 2006/0098671 A1    May 11, 2006

(51) Int. Cl.
*H04L 12/28* (2006.01)
*H04B 10/20* (2006.01)

(52) U.S. Cl. ............... 370/255; 370/404; 370/907; 398/59

(58) Field of Classification Search ............... None
See application file for complete search history.

(56) References Cited

U.S. PATENT DOCUMENTS 6,829,216 B1 *   12/2004   Nakata ................ 370/228

OTHER PUBLICATIONS

Acharya, S., et al., *Hitless Network Engineering of SONET Rings*, 5 pages, Globecom 2003.

Foulser, D.E., et al., *A Theory of Plan Merging*, Artificial Intelligence, 57, 1992, pp. 143-181.

Itoga, S.Y., et al., *The String Merging Problem*, BIT, 21, 1981, pp. 20-30.

Jiang, T., et al., *On the Approximation of Shortest Common Supersequences and Longest Common Subsequeces*, SIAM Journal on Computing, 24(5), Oct. 1995, pp. 1122-1139.

Middendorf, M., More on the complexity of common superstring and supersequence problems, *Theoretical Computer Science* 125 (1994), 205-228.

\* cited by examiner

*Primary Examiner*—Huy D. Vu
*Assistant Examiner*—Nittaya Juntima
(74) *Attorney, Agent, or Firm*—Kenneth M. Brown (57) ABSTRACT

A method for determining a master ring for an optical communications network having nodes arranged in a plurality of interconnected ring structures. (A master ring is a ring structure which contains every node in the network exactly once, and which also respects the node ordering of every individual ring.) An efficient solution to the master ring problem is provided by advantageously limiting the enumeration process based on the consistency of the enumeration of individual rings with each other. Illustratively, an intersection graph of the network is generated; one or more of the rings is chosen and possible openings of each of these rings are enumerated; and a limited number of possible openings of one or more other (i.e., non-chosen) rings are enumerated such that the enumeration of the possible openings of the other (i.e., non-chosen) rings are consistent therewith.

12 Claims, 7 Drawing Sheets

METHOD FOR DETERMINING A MASTER RING FOR AN OPTICAL COMMUNICATIONS NETWORK

FIELD OF THE INVENTION

The present invention relates generally to the field of optical communications networks having nodes arranged in a plurality of interconnected ring structures, and more particularly to a method for determining a master ring for such an optical network.

BACKGROUND OF THE INVENTION

The prevalence of SONET ("Synchronous Optical Network") technology has made the ring a popular network topology for optical networks. (SONET technology is fully familiar to those of ordinary skill in the art.) To carry a demand between two nodes on a SONET ring, traffic is routed simultaneously clockwise and counter-clockwise, one as the primary path and the other as the backup path. Often an optical network consists of a collection of a plurality of interconnected SONET rings. As is well known to those skilled in the art, a "master ring" is a ring structure which contains every node in the network (i.e., in one or more of these individual interconnected rings) exactly once, and which also respects the node ordering of every individual SONET ring. We will refer to the problem of finding such a ring, whenever it exists, as the "master ring problem" (MRP).

Mathematically, the master ring problem may be defined as follows. Suppose that a network consists of K rings, $R_1, \ldots R_K$, with $n_1, \ldots n_K$ distinct nodes, respectively. Each ring has two possible "orientations"—clockwise and counter-clockwise. We say that R is a "sub-ring" of M (or that M is a "master ring" of R) if either the clockwise or the counter-clockwise orientation of R can be obtained from M by removing zero or more nodes from M. Specifically then, the goal of the master ring problem is to find a master ring of all of the rings in the network (e.g., $R_1, \ldots R_K$) whenever it exists.

Figure 1:
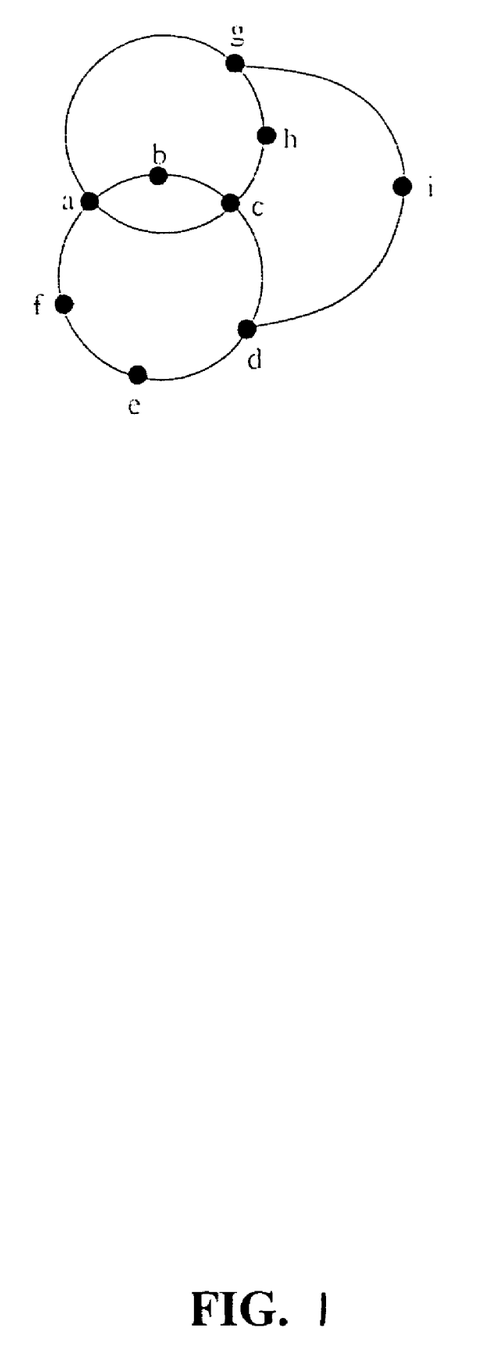
FIG. 1 shows an illustrative optical network consisting of interconnected rings.
Figure 2:
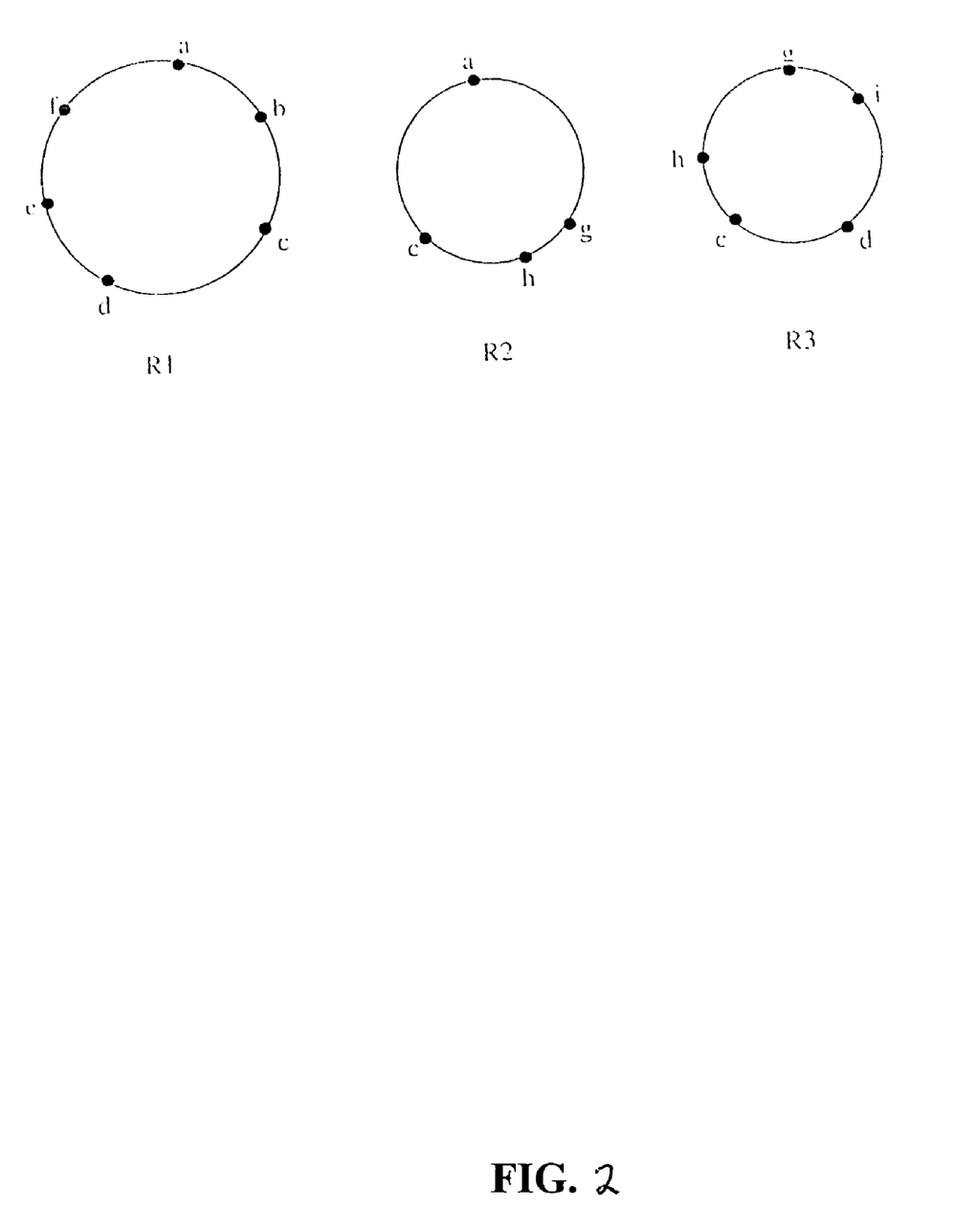
FIG. 2 shows the individual rings which make up the illustrative optical network of FIG. 1.

FIG. 1 shows an illustrative optical network consisting of interconnected rings. FIG. 2 shows the individual rings which make up the illustrative optical network of FIG. 1. In particular, the illustrative optical network of FIG. 1 may be separated into three individual and interconnected rings—R1, R2 and R3. (It can be seen that these rings are interconnected by virtue of the fact that each ring shares one or more nodes with another ring.) In particular, ring R1 consists of the node sequence abcdef, ring R2 consists of the node sequence achg, and ring R3 consists of the node sequence ghcdi.

Figure 3:
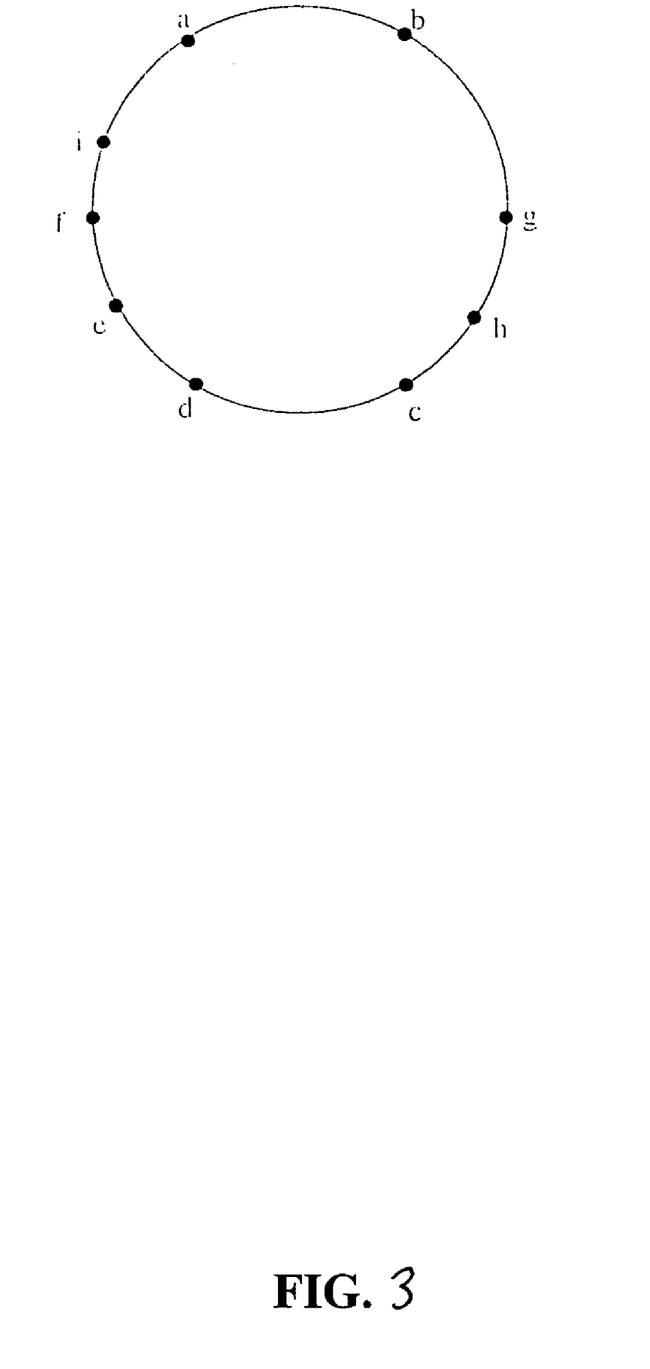
FIG. 3 shows one possible example of a master ring for the illustrative optical network of FIG. 1.

FIG. 3 shows one possible example of a master ring for the illustrative optical network of FIG. 1. In particular, the example master ring shown for the illustrative network consists of the node sequence abghcdefi. It can be shown that the example master ring shown in FIG. 3 is, in fact, a master ring for the illustrative network of FIG. 1 (and shown separated into individual rings in FIG. 2), since each of the rings R1, R2, and R3 can be seen to be a sub-ring thereof. In particular, R1 is a sub-ring since its clockwise sequence abcdef is a sub-sequence of abghcdefi; R2 is a sub-ring since its clockwise sequence aghc is a sub-sequence of abghcdefi; and R3 is a sub-ring since its counter-clockwise sequence ghcdi is a sub-sequence of abghcdefi.

There are a number of reasons for finding master rings. For example, as a network evolves with growing traffic, it often expands from an initially small number of SONET rings to include a large collection of rings. Unfortunately, such expansion is often carried out in an ad-hoc manner, with circuits added and torn down over time. As a result, the network may have unnecessarily complex topology that makes network management excessively complex. One advantageous approach to solving this problem is to replace the complicated network with one of simple topology such as a master ring. Since a master ring respects the node ordering of every existing network ring, it has the advantage of preserving the routing label of every demand within an existing SONET ring. Indeed, although a demand may traverse more nodes around the master ring than around its original SONET ring, preserving the order in which the SONET nodes are traversed allows one to efficiently update the routing tables rather than redefine from scratch the Label Switched paths. (Label Switched paths are used, e.g., in Multi Protocol Label Switching, a technique familiar to those skilled in the art.) Even if the network is not intended to be rebuilt, it is still necessary that routine downtime, such as for purposes of software upgrade, can be handled. In this situation, a master ring can advantageously serve as a simple backup topology.

First, note that a master ring can be viewed as a "logical" ring—that is, neighboring nodes of the ring do not need to be physically connected by links already existing in the network. (For example, such links can be added once the master ring is defined as a new/backup topology.) In addition, note that if two SONET rings $R_i$ and $R_j$ intersect, then they invariably will have at least two nodes in common, since the presence of two (or more) common nodes can advantageously tolerate one node failure when supporting a demand between a node in $R_i$ and a node in $R_j$.

Note also that one convenient way to represent rings is to use sequences. (See, for example, the discussion of FIGS. 1-3, above.) Each orientation of a ring with n nodes corresponds to n possible sequences, depending on the node with which the sequence begins. For example, the ring R1 in FIG. 2 has 6 clockwise sequences—abcdef, bcdefa, cdefab, defabc, efabcd, and fabcde—and 6 counter-clockwise sequences—fedcba, edcbaf, dcbafe, cbafed, bafedc, and afedcb. We also refer to each sequence as an "opening" of a ring, since the represented sequence of nodes may be thought of as being opened "between" the last node and the first node (i.e., as if the ring had the link between the last node and first node removed). Moreover, we say that S is a "sub-sequence" of T (or, equivalently, that T is a "super-sequence" of S) if S can be obtained from T by erasing zero or more symbols therefrom. Therefore, R is a "sub-ring" of M (or, equivalently M is a master ring of R) if some sequence that corresponds to R is a sub-sequence of a sequence that corresponds to M. (See, for example, FIGS. 2 and 3.)

Mathematically, the master ring problem can be shown to be "NP-hard." (As is well known to those skilled in the art, an "NP-hard" problem is one which, in general, takes an exponential amount of time, and, therefore, cannot always be solved within the practical realities of computational limitations.) Prior art techniques for finding a master ring for a network comprising a set of interconnecting individual rings involve a "brute-force" exhaustive enumeration of essentially all possibly ways of combining the individual rings into a single (all-encompassing) ring. Such approaches can only handle relatively small instances of the master ring problem (i.e., those having a relatively small number of rings each with a relatively small number of nodes). Thus, it would be highly desirable to have a more practical method than those of the prior art for solving the master ring problem.

SUMMARY OF THE INVENTION

In accordance with the principles of the present invention, an improved method for solving the master ring problem is provided by advantageously limiting the enumeration process based on the consistency of the enumeration of individual rings with each other. Specifically, a dominating set of rings is identified, wherein the dominating set comprises one or more individual rings such that one or more of the rings not in the dominating set intersects with (i.e., includes one or more nodes in common with) at least one ring in the dominating set. Then, after enumerating possible openings of one or more rings in the dominating set, a limited number of possible openings of one or more rings not in the dominating set are enumerated, wherein these limited number of possible openings of the rings not in the dominating set are chosen to be consistent with the enumerations of the rings in the dominating set.

In particular, in accordance with one illustrative embodiment of the present invention, a method for generating a master ring for a network of interconnected individual rings comprises generating an intersection graph of the network, wherein the intersection graph is representative of the interconnections among the individual rings; choosing a dominating set of one or more of rings based on the intersection graph; enumerating possible openings of each of these chosen rings; and enumerating a limited number of possible openings of one or more other rings (i.e., rings not in the dominating set) based on the intersection graph and on the enumerations of the chosen rings (in the dominating set), such that the enumeration of the possible openings of the rings not in the dominating set are consistent with the enumerations of the chosen rings in the dominating set.

DETAILED DESCRIPTION OF THE ILLUSTRATIVE EMBODIMENTS

A First Illustrative Embodiment of the Invention

In accordance with certain illustrative embodiments of the present invention, we are given K sequences of symbols (representing a set of K individual rings of nodes), and we determine a super-sequence of each of these K sequences (representing a master ring of the K individual rings), wherein the super-sequence contains each symbol exactly once. (Note that we will only determine such a super-sequence if in fact one exists.)

First, we advantageously construct a directed graph $G=(V, E)$, whose vertex set V consists of the symbols in the K sequences and whose edge set consists of directed edges of the form (a, b), where a appears immediately before b in a sequence. If G is acyclic, then a topological sort of G is a super-sequence of all K sequences. (As is well known to those of ordinary skill in the art, a topological sort is an arrangement of items in a partial order—that is, when some but not all items have an order. In addition, methods for deciding whether a directed graph is acyclic and methods for finding a topological sort thereof are each well known to those skilled in the art.) Finally, according to the illustrative embodiment of the present invention, we determine the set of sequences obtained by opening the rings in accordance with the following procedure.

In particular, in accordance with the illustrative embodiment of the present invention, we apply enumeration guided by an "intersection graph" of the network, wherein the intersection graph is representative of the interconnections among the individual rings. The graph is advantageously used to identify subsets of rings whose openings leave only a few consistent openings for other rings, thereby decreasing the remaining number of enumeration steps. Specifically, the combination of enumeration and use of the intersection graph advantageously yields a significant improvement over prior art techniques, and advantageously ensures that a master ring will be found, if one exists.

As explained above, a typical prior art approach to the master ring problem involves the enumeration of all possible sequences for each individual ring and the determination of whether there is a topological sort for each resulting directed graph. In accordance with the illustrative embodiment of the present invention, however, we can advantageously avoid enumerating many of these possibilities by using the intersection graph of the network to guide the enumeration process.

First, in accordance with the illustrative embodiment of the present invention, we advantageously eliminate all "singleton" nodes from each ring—that is, those nodes that appear only in one ring. If node s is a singleton, for example, then clearly a can be essentially ignored when constructing the master ring. If a master ring exists without a, then a may always be added to the master ring after the fact. Thus, we will assume in the discussion of the illustrative embodiment herein that every node appears in at least 2 rings.

Next, we construct an undirected intersection graph H that shows how the rings are interconnected. The graph H consists of K vertices, each corresponding to one of the K rings. In addition, if two rings share common nodes, then there is an edge between their corresponding vertices in the graph H. For clarity, we will use herein the terms "vertices" and "edges" when referring to the elements in the graph H and the terms "nodes" and "links" when referring to the elements of a ring. We will also use letters near the beginning of the alphabet (such as, for example, a, b, c and d) when referring to the nodes in a ring and letters near the end of the alphabet (such as, for example, u, v and w) when referring to vertices in the graph H. And for a vertex u in the graph H, we will use $R_u$ to represent the corresponding ring.

Consider a vertex u in the graph H. If $R_v$ is already opened, and v is an immediate neighbor of u in the graph H, then the number of "consistent" openings of $R_u$ is limited. (We say that a set of sequences are "consistent" if they have a super-sequence.) For example, suppose that $R_u$ and $R_v$ have the nodes a and b in common, and that the opening of $R_v$ orders a before b; then, in order to be consistent, an opening of $R_u$ would have also order a before b as well (in order to be consistent).

Figure 4:
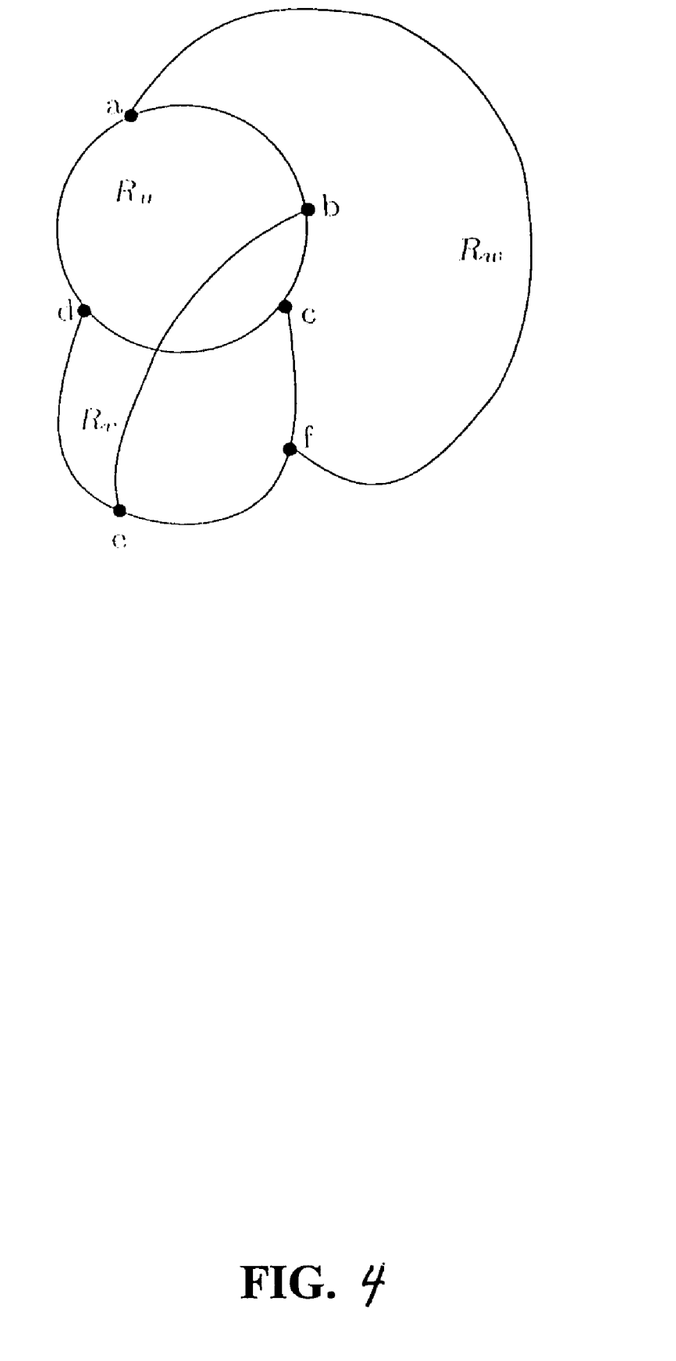
FIG. 4 shows a second illustrative optical network consisting of interconnected rings.
Figure 5:
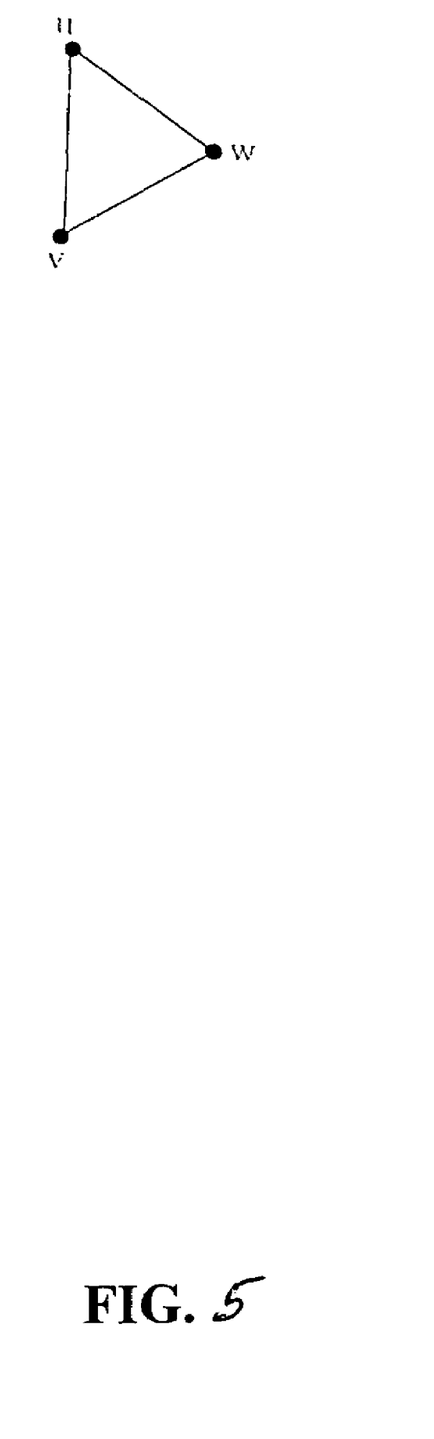
FIG. 5 shows an intersection graph of the illustrative optical network of FIG. 4 generated in accordance with an illustrative embodiment of the present invention.

Note, however, that even if any two neighboring rings have consistent openings, it does not necessarily imply consistent openings for all rings. Consider the example of FIG. 4, which shows a second illustrative optical network consisting of interconnected rings. In particular, the second illustrative optical network shown in FIG. 4 comprises 3 individual rings—$R_u$ comprising nodes abcd, $R_v$ comprising cdef, and $R_w$ comprising befa. FIG. 5 shows an intersection graph of the illustrative optical network of FIG. 4 generated in accordance with an illustrative embodiment of the present invention. And FIG. 6 shows one possible master ring for the illustrative optical network of FIG. 4.

Figure 6:
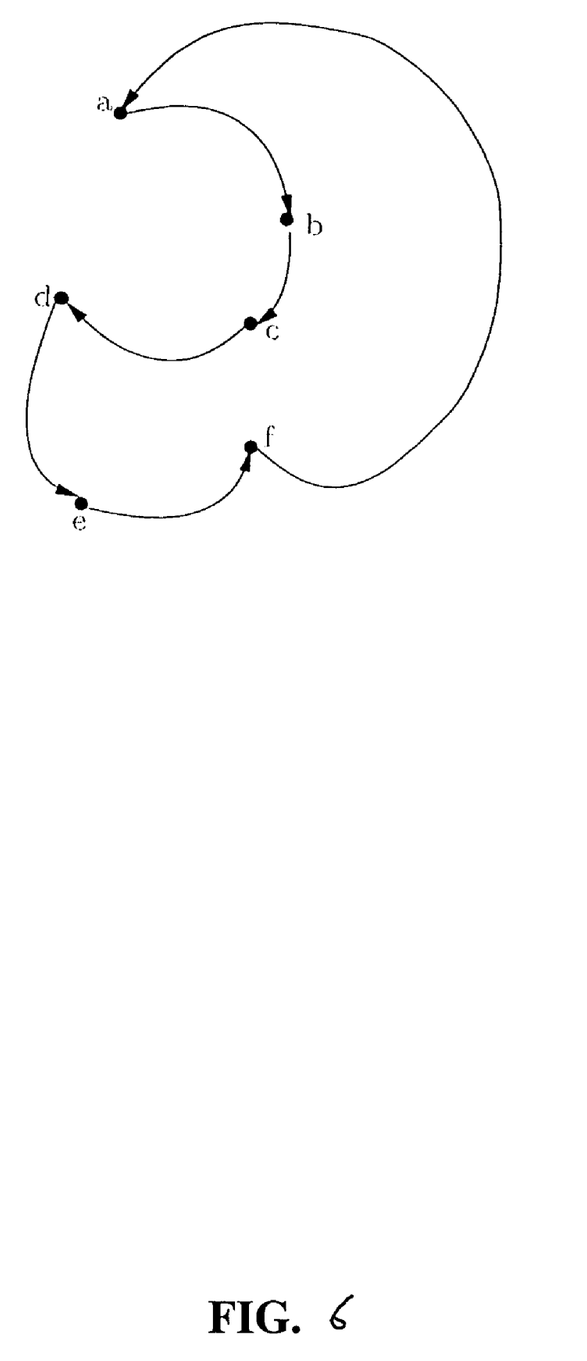
FIG. 6 shows one possible master ring for the illustrative optical network of FIG. 4.

Note from FIG. 6 that when $R_u$ is oriented clockwise, and $R_v$ and $R_w$ are oriented counter-clockwise, they induce a large master ring abcdef. If $R_u$ corresponds to the sequence abcd, $R_v$ corresponds to cdef, and $R_w$ corresponds to efab then this induced ring is not broken. Therefore, these three openings cannot be consistent with one another. However, note that any two of these openings are consistent. If, however, $R_w$ has the opening abef then the three openings are consistent and have a master ring abcdef. Thus, this illustrative example shows that we cannot always use an intersection graph such as graph H in FIG. 5 alone for determining good openings for all rings, since such a graph indicates only the "local" dependencies among the rings. To guarantee that no induced rings remain in the network after we open $R_1, \ldots, R_K$, we advantageously use the properties of the intersection graph H as a guidance for the herein described method in accordance with an illustrative embodiment of the present invention.

Specifically, in accordance with the herein described illustrative embodiment of the present invention, we advantageously identify a low-degree vertex u in the intersection graph H and enumerate all possible openings of the neighboring rings to the ring represented by vertex u. Note that since u has a low degree, relatively few rings are opened—nonetheless, this advantageously limits the number of consistent openings of $R_u$.

When the intersection graph H has only high-degree vertices, we find a "dominating set" of vertices. In particular, in accordance with the illustrative embodiment of the present invention, a dominating set of vertices consists of those vertices that are neighbors to every vertex not in the set. In other words, a dominating set of rings D may be advantageously defined in the context of the illustrative embodiment of the present invention to be a subset of the network rings such that each ring not in the set D intersects with at least one ring in the set D.

Note that advantageously, we can clearly find a fairly small dominating set in a graph with high degree vertices. By enumerating all possible openings for the (small number of) vertices in the dominating set, we advantageously reduce the number of consistent openings for each remaining vertex by a constant factor. For example, we illustratively set a parameter $\delta = \log n/c$, where $c \geq 3$ is a predetermined constant. Then, if a vertex u in the intersection graph H has degree lower than $\delta$, then u is defined to be a "low-degree" vertex.

Figure 7:
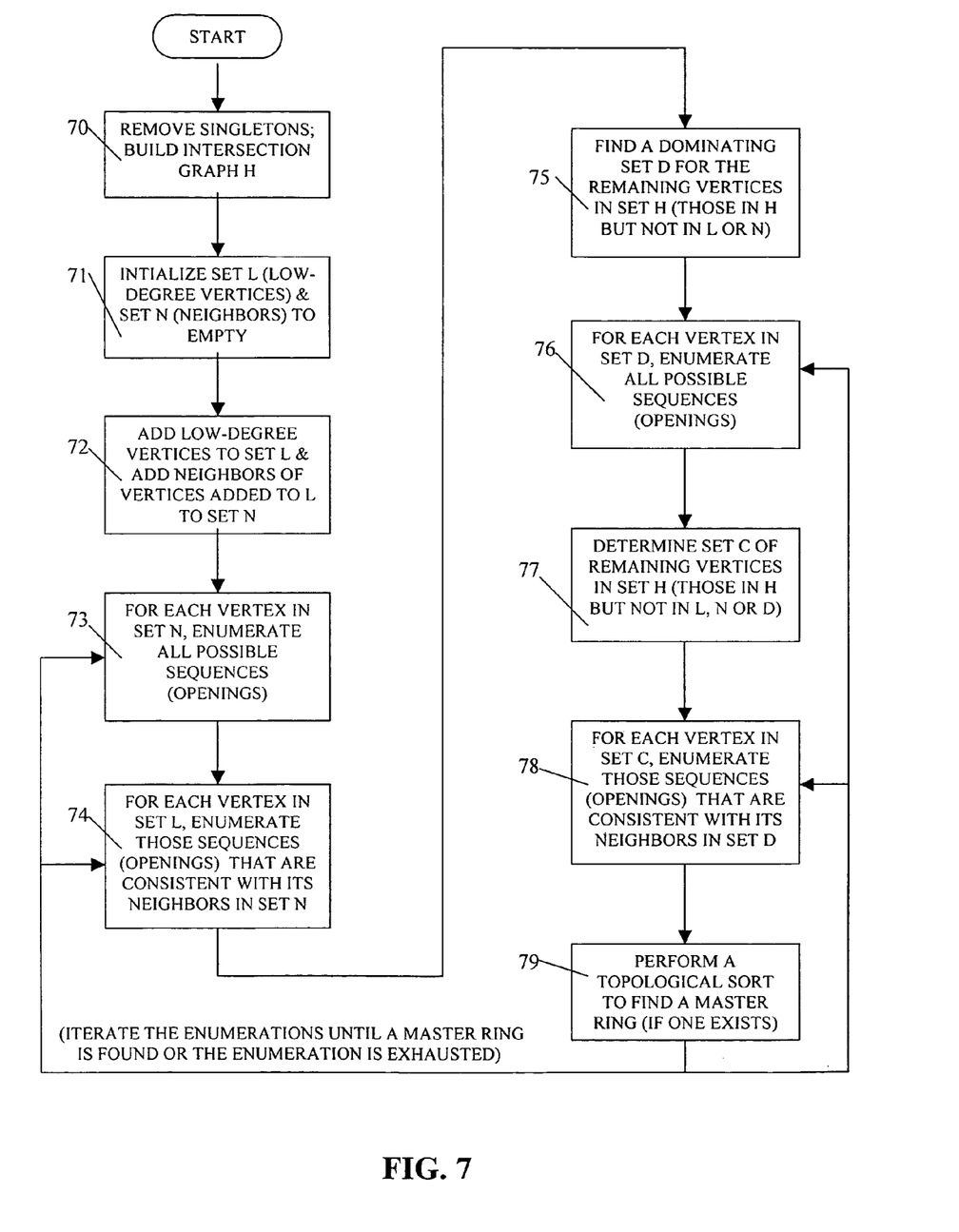
FIG. 7 shows a flowchart of a method for determining a master ring for a network comprising a set of interconnecting individual rings in accordance with one illustrative embodiment of the present invention.

FIG. 7 shows a flowchart of a method for determining a master ring for a network comprising a set of interconnecting individual rings in accordance with one illustrative embodiment of the present invention. The illustrative method is divided into a preliminary "step" followed by three "phases." In the preliminary step (shown in block 70 of the flowchart) all singleton nodes are eliminated from each of the individual rings, $R_1, \ldots, R_K$, and an intersection graph H is constructed from the network of interconnected individual rings.

Then, in phase 1, the low-degree vertices of the intersection graph H and their neighboring vertices are processed. Specifically, phase 1 begins (as shown in block 71 of the flowchart) by initializing two sets—L (which will represent the set of low-degree vertices) and N (which will represent the set of neighbors thereof)—to be empty, and then by examining each vertex in H in turn and placing certain vertices in the set L of low-degree vertices and certain vertices in the set N of low-degree vertex neighbors. In particular (as shown in block 72 of the flowchart), for each low-degree vertex v not already in the set L and also not in N, we add the vertex v to the set L and its neighbors to the set N. Then (as shown in block 73 of the flowchart), for each vertex u in the set N, we enumerate all possible sequences for $R_u$. And finally (as shown in block 74 of the flowchart), for each vertex v in the set L, we enumerate each of the consistent possible sequences for $R_v$. In particular, if the vertex v has x neighbors in the intersection graph H, we can advantageously identify at most x possible sequences for $R_v$ that are, in fact, consistent with the sequences chosen for the neighbors of v (which have already been chosen as part of the enumeration performed in step 73 of the flowchart—see above).

More specifically, in the enumeration of the low-degree vertices, we can identify the (at most) x possible consistent sequences as follows. Let u be a neighbor of v and $S_u$ be the sequence representing the opening of the ring $R_u$. Consider the subsequence $T_u$ of $S_u$ that consists of the nodes common to $R_u$ and $R_v$. Let $a_u$ be the first symbol in $T_u$. Since we have already removed all singleton nodes, we know that $U_u T_u$ contains all the nodes in $R_v$. Therefore, if $S_v$ begins with a node in $T_u$ for some neighbor u, then $S_v$ has to begin with $a_u$; otherwise, $S_v$ cannot be consistent with $S_u$. Furthermore, if $S_v$ starts with $a_u$ it has to follow the direction dictated by $T_u$. If $T_u$ consists of 3 or more nodes, then this direction is unique. If $T_u$ consists of only 2 nodes, then either the clockwise or the counter-clockwise direction could be consistent. We examine the two neighboring nodes b and c of $a_u$ on ring $R_u$ that are not in $T_u$. For $S_v$ to start at $a_u$ and continue with b, b has to be the first node in some other subsequence $T_{u'}$ for some neighbor u', or else $S_v$ cannot be consistent with $S_{u'}$. In addition, if both b and c are the first nodes of some subsequences, no matter which direction $S_v$ takes, $S_v$ cannot be consistent with both. Therefore, $S_v$ can only start with at most x nodes and for each starting node there is only one possible direction. Moreover, these can be easily enumerated based on the chosen sequences for each of the neighboring rings.

Next, in phase 2 of the illustrative method of FIG. 7, a dominating set is identified and processed. In particular (as shown in block 75 of the flowchart), we first find a dominating set D of the subset of vertices of the intersection graph which exclude those vertices in sets and N. In other words, we find a dominating set D for the vertices in the subset V-L-N of H. And finally (as shown in block 76 of the flowchart), for each vertex u in the set D, we enumerate all possible sequences for $R_u$.

Finally, in phase 3, we process all of the remaining vertices of the intersection graph H, namely, those in the set C=V-L-N-D, and then use a topological sort to find a super-sequence (i.e., a master ring). Specifically (as shown in block 77 of the flowchart), we first determine the set C of the remaining (i.e., unprocessed) vertices of the intersection graph H by setting C=V-L-N-D. Then (as shown in block 78 of the flowchart), for each vertex u in the set C, we enumerate half of all of the possible sequences for $R_u$. In particular, it can be shown that at most half of these sequences are consistent with the sequences of its neighbors as follows.

First, note that every vertex u in the set C necessarily has some neighbor v in the dominating set D (by the construction of the dominating set D). Moreover, by assumption, $R_u$ and $R_v$ have at least 2 nodes, say a and b, in common. Any sequence of $R_v$ defines an ordering of a and b—that is, either a appears before b or after b. Among the 2n sequences of $R_u$ (assuming that $R_u$ has n nodes), exactly n of these sequences respect this ordering of a and b. Any of the other n sequences that disrespect the ordering cannot produce a topological sort and therefore need not be considered. Thus, for any vertex u in the set C, it suffices to enumerate only the (at most) n sequences for the ring $R_u$ which are consistent with the chosen sequence of the (at least one) neighboring ring which has already been chosen.

Finally (as shown in block 79 of the flowchart), given each chosen combination of sequences for all vertices in N, L, D and C, a topological sort is advantageously used to find a super-sequence (and thus a master ring), if it exists. Once a master ring is found, the process exits—if no master ring is found after all enumerated combinations of sequences have been checked (with use of a topological sort), then no master ring exists for the given network.

A Second Illustrative Embodiment of the Invention

In accordance with one illustrative embodiment of the present invention, we can advantageously further reduce the number of enumerations employed in phase 3 of the above-described method by using a "pairing algorithm." In particular, rather than directly enumerating n possible sequences for each ring $R_u$ having n nodes, where u is the set C, as described above (see the discussion of block 78 of the flowchart of FIG. 7), we can advantageously pair up many of these n sequences so that one sequence in a pair begins with a node, say a, and the other sequence in the pair ends with the node a. In such a case, we will refer herein to a as the "pivot" of the pair. (Note that at most 3 out of the n possible sequences cannot be paired up with another sequence.)

Consider the following specific example. For a vertex u in the set C, suppose that the ring $R_u$ has 6 nodes abcdef arranged clockwise. Suppose also that v is a neighbor of u and in the set D, and that a sequence for $R_v$ has been chosen in which b precedes e. Then, any sequence for $R_u$ needs to have b before e (in order to be consistent), and otherwise there will be no topological sort. Among the 12 possible sequences for $R_u$, the following 6 have b before e—abcdef, bcdefa, fabcde, dcbafe, cbafed, and bafedc. We can advantageously pair up the 1st and 2nd sequences, abcdef and bcdefa, having pivot a, and we can also advantageously pair up the 4th and 5th sequences, dcbafe and cbafed, having pivot d. (Note that the 3rd sequence, fabcde, and the 6th sequence, bafedc, remain unpaired.)

In accordance with this illustrative embodiment of the present invention, we advantageously enumerate each of the unpaired sequences but only one of the two sequences in each of the pairs determined as described above. In particular, it can be seen that for each such pair of possible sequences for a vertex in the set C, it is not necessary to try both possibilities.

Specifically, suppose, for example, that ring $R_u$, where u is a vertex in the set C, has the above 6 possible sequences and that we are considering the first pair described above having pivot a. Since a is not a singleton node (because all singleton nodes have been previously removed), a necessarily appears in some other ring, say $R_w$. If the sequence for $R_w$ has already been chosen, then we necessarily know which of the two paired up sequences—abcdef or bcdefa—is consistent with $R_w$ because $R_u$ and $R_w$ must share a node other than a—we will call this node c. Then, since a is a pivot for $R_u$, if a appears before c for $R_w$ then only the first sequence abcdef can be consistent, while if a appears after c for $R_w$ then only the second sequence bcdefa can be consistent.

In general, according to this illustrative embodiment of the present invention, we construct a directed graph F where each vertex corresponds to a vertex in the set C. We then put a directed edge from vertex u to vertex w in the directed graph F if the pivot of u is a vertex in the ring $R_w$. (If there are multiple such rings $R_w$ for u we advantageously choose an arbitrary one.) As explained above, therefore, if there is a directed edge from u to w, then having enumerated both of the choices in a given pair for $R_w$, the choice for $R_u$ is implied (in order to be consistent).

We can advantageously determine which rings to (fully) enumerate as follows. We conceptually mark a "cross" on a vertex to indicate that the choice is implied and we conceptually mark a "circle" on a vertex to indicate that we enumerate both possibilities. Initially, we (conceptually) mark a cross on a vertex u if it has no outgoing edges. This means the pivot of u appears in some ring $R_w$ that belongs to one of the sets L, N, or D. Hence, the sequence for $R_w$ is already chosen and therefore the sequence for $R_u$ is implied (to be consistent). Then, for each vertex u in the set F that is not yet marked (conceptually, with either a cross or a circle), we follow the directed edges, starting from u, until (i) we have reached a marked vertex (either with a circle or with a cross), or (ii) we stop right before the path from u intersects itself—i.e., when we reach a vertex z such that there is an edge in the graph from z to u. In the latter case, we mark with a circle the vertex where we have stopped. In both cases, we also mark with a cross every (previously unmarked) vertex along the path.

Additional Illustrative Embodiments of the Invention

In accordance with still another illustrative embodiment of the present invention, the principles of the present invention may be advantageously employed to solve what has been referred to as the "ring clearance problem." In particular, the ring clearance problem is directed to the generation of a master ring such that that we can completely "clear" a given ring, say $R_1$, and reroute all of the network traffic through the other rings. In order for such a transition to occur, it is assumed that $R_1$ intersects with each of the other rings in the network. In other words, given the intersection graph H as generated in accordance with certain illustrative embodiments of the present invention, every vertex is a neighbor of the vertex w corresponding to $R_1$. Hence, the set containing only the vertex w is necessarily a dominating set (as defined above and also used in accordance with these certain illustrative embodiments of the present invention) for all vertices in the intersection graph H.

Therefore, in accordance with this other illustrative embodiment of the present invention, we can advantageously apply only phase 3 of the above-described illustrative method of FIG. 7. In particular, it can be easily seen that any opening of a ring $R_1$ (i.e., the ring to be "cleared"), advantageously limits the number of openings of any other ring in the network to at most half of its possible sequences. And in accordance with yet another illustrative embodiment of the present invention, we can also follow the more sophisticated pairing argument described in accordance with the other illustrative embodiment above, thereby advantageously reducing the number of possible sequences which are enumerated even further.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

We claim:

1. A method for determining a master ring for a communications network, the communications network comprising a plurality of individual rings, each of said individual rings having a plurality of nodes interconnected in a ring structure, each of said individual rings having at least one node thereof in common with at least one other one of said individual rings, the method comprising the steps of:
   identifying a dominating set of rings, said dominating set of rings comprising one or more of said individual rings such that one or more of said plurality of individual rings not in said dominating set has at least one node in common with at least one of said individual rings in said dominating set;
   enumerating a set of one or more possible openings of one or more of said rings in said dominating set;
   for a given element of said enumerated set of possible openings of said rings in said dominating set, enumerating a limited set of possible openings of at least one of said individual rings not in said dominating set, each of said possible openings in said limited set of possible openings of said rings not in said dominating set being consistent with said given element of said enumerated set of possible openings of said rings in said dominating set; and
   determining whether at least one of said possible openings for each of said at least one of said rings not in said dominating set, in combination with said given element of said enumerated set of possible openings of said one or more of said rings in said dominating set, is representative of a master ring for said communications network.

2. The method of claim 1 wherein said communications network comprises an optical communications network and wherein each of said individual rings comprises a SONET ring.

3. The method of claim 1 wherein said dominating set of rings comprises one or more of said individual rings such that each of said plurality of individual rings not in said dominating set has at least one node in common with at least one of said individual rings in said dominating set.

4. The method of claim 3 wherein said dominating set consists of exactly one individual ring and wherein determining a master ring of said communications network results in solving a ring clearance problem with respect to said one individual ring.

5. The method of claim 1 further comprising the step of:
   identifying one or more singleton nodes in one or more of said individual rings, each of said one or more singleton nodes being included in exactly one of said individual rings; and
   removing said identified singleton nodes from said one of said individual rings in which it is included.

6. The method of claim 1 further comprising the step of generating an intersection graph of said communications network, wherein said intersection graph comprises a plurality of vertices and one or more edges, each of said vertices corresponding to one of said individual rings comprised in said communications network, and each edge interconnecting two of said vertices when said individual rings corresponding to said two of said vertices have at least one node thereof in common.

7. The method of claim 6 further comprising the steps of:
   identifying one or more low degree vertices in said intersection graph, said low degree vertices having at most a predetermined number of edges of said intersection graph connected thereto;
   identifying one or more low degree vertex neighbors in said intersection graph, said low degree vertex neighbors in said intersection graph having an edge interconnecting it with at least one of said identified low degree vertices;
   enumerating a set of one or more possible openings of one or more of said individual rings corresponding to said identified low degree vertex neighbors in said intersection graph; and
   for a given element of said enumerated set of possible openings of said one or more of said individual rings corresponding to said identified low degree vertex neighbors in said intersection graph, enumerating a limited set of possible openings of at least one of said individual rings corresponding to said identified low degree vertices in said intersection graph, each of said possible openings in said limited set of possible openings of said at least one of said individual rings corresponding to said identified low degree vertices in said intersection graph being consistent with said given element of said enumerated set of possible openings of said one or more of said individual rings corresponding to said identified low degree vertex neighbors in said intersection graph.

8. The method of claim 7 wherein said dominating set of rings comprises one or more of said individual rings such that each of said plurality of individual rings not in said dominating set and not corresponding either to said identified low degree vertices in said intersection graph or to said identified low degree vertex neighbors in said intersection graph, has at least one node in common with at least one of said individual rings in said dominating set.

9. The method of claim 1 wherein said step of enumerating said limited set of possible openings of said at least one of said individual rings not in said dominating set comprises identifying at least one individual ring in said dominating set which has at least one node in common with one of said at least one of said individual rings not in said dominating set, and wherein said limited set of possible openings of said at least one of said individual rings not in said dominating set is limited based on consistency with an opening of said identified ring included in said given element of said enumerated set of possible openings of said one or more of said individual rings in said dominating set.

10. The method of claim 9 wherein said step of enumerating said limited set of possible openings of said at least one of said individual rings not in said dominating set further comprises identifying one or more pairs of possible openings of said at least one of said individual rings not in said dominating set, each such pair of possible openings having a pivot node associated therewith wherein such pair of possible openings comprises one possible opening which ends with said pivot node and one possible opening that begins with said pivot node, and wherein said limited set of possible openings of said at least one of said individual rings not in said dominating set includes at most one of each of said pairs of possible openings thereof.

11. The method of claim 10 wherein said step of enumerating said limited set of possible openings of said at least one of said individual rings not in said dominating set further comprises generating a directed graph comprising a plurality of vertices and one or more directed edges, each vertex corresponding to one of said individual rings not in said dominating set, and each directed edge connecting a first associated vertex to a second associated vertex when said first associated vertex corresponds to one of said rings not in said dominating set, and when one of said pairs of possible openings of said one of said individual rings not in said dominating set has an associated pivot node which is common to said individual ring corresponding to said second vertex, and wherein said limited set of possible openings of said at least one of said individual rings not in said dominating set is determined based on said directed graph.

12. The method of claim 1 wherein said step of determining whether at least one of said possible openings for each of said at least one of said individual rings not in said dominating set, in combination with said given element of said enumerated set of possible openings of said one or more of said individual rings in said dominating set, is representative of a master ring for said communications network, comprises performing a topological sort.

* * * * *